United States Patent [19]

Einhaus

[11] Patent Number: 4,539,672
[45] Date of Patent: Sep. 3, 1985

[54] LOW FRICTION PHONOGRAPH TONE ARM TRAVERSE

[75] Inventor: Hermanus F. Einhaus, Eindhoven, Netherlands

[73] Assignee: U.S. Philips Corporation, New York, N.Y.

[21] Appl. No.: 551,742

[22] Filed: Nov. 14, 1983

[30] Foreign Application Priority Data

Nov. 24, 1982 [NL] Netherlands ............ 8204561

[51] Int. Cl.³ ............................................. G11B 3/38
[52] U.S. Cl. .................................. 369/244; 369/249; 369/255
[58] Field of Search ............... 369/244, 245, 249, 255

[56] References Cited

U.S. PATENT DOCUMENTS

| | | | |
|---|---|---|---|
| 2,219,230 | 10/1940 | Krause | 369/249 |
| 2,640,700 | 6/1953 | Mortimer et al. | 369/249 |
| 2,676,808 | 4/1954 | Masterson | 369/245 |
| 3,129,946 | 4/1964 | Rabinow | 369/230 |
| 3,209,151 | 9/1965 | Lillestrand | 33/366 |
| 3,390,886 | 7/1968 | Rabinow | 369/255 |
| 4,453,243 | 6/1984 | Tanaka et al. | 369/249 |

Primary Examiner—Steven L. Stephan
Attorney, Agent, or Firm—David R. Treacy

[57] ABSTRACT

The tone arm (13) of a record player is carried by a carriage (14) which is movable along a motor-driven rotating spindle (6) extending tangentially with respect to the axis of the turntable (10). For supporting it on the spindle the carriage has two bearings (15 and 16) which are spaced from each other in the axial direction of the spindle and each of which has a bearing surface which engages the spindle at only the upper part of the circumference of the spindle. This arrangement permits slight pivotal movements of the carriage relative the spindle about axes transverse to the spindle to compensate for the forces which occur during accelerations of the tone arm, as when the stylus enters the lead-out groove. The tone arm is connected to a part (20) of the carriage which is made of a vibration-damping material.

16 Claims, 8 Drawing Figures

U.S. Patent Sep. 3, 1985 Sheet 1 of 3 4,539,672
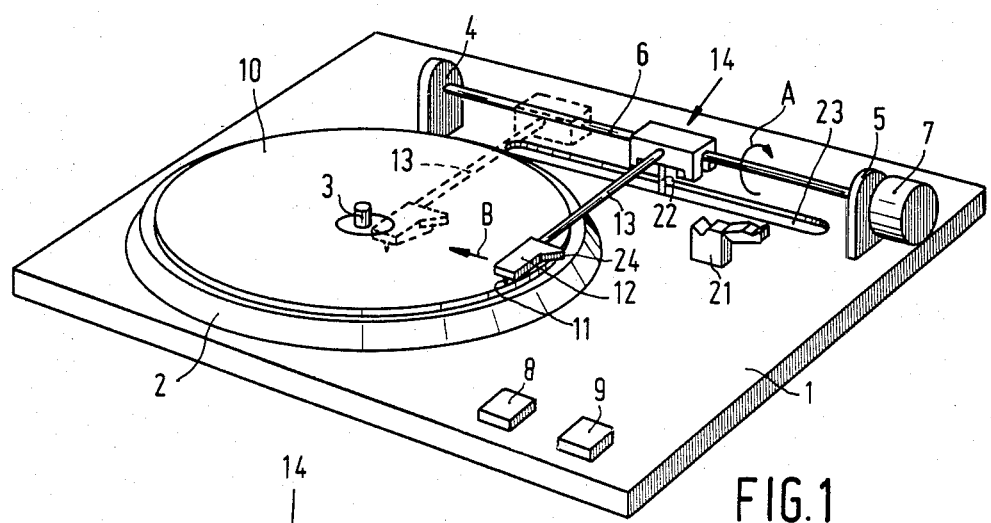
FIG.1
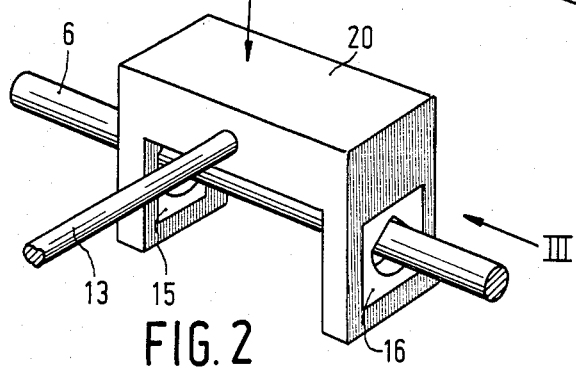
FIG.2
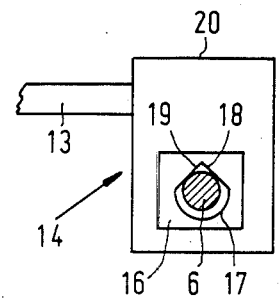
FIG.3
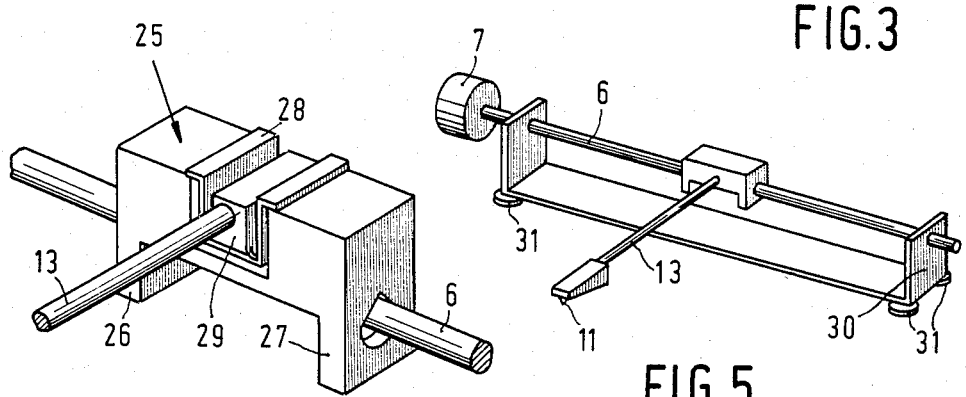
FIG.4
FIG.5

LOW FRICTION PHONOGRAPH TONE ARM TRAVERSE

BACKGROUND OF THE INVENTION

The invention relates to a record player comprising a turntable, a rotatable spindle which extends tangentially with respect to the rotational axis of the turntable, a motor for rotating the spindle during operation of the record player, and a carriage which is movable axially along the spindle and which carries a tone arm.

A record player of this type is disclosed in U.S. Pat. No. 3,129,946. As it scans a record, for short intervals of time the tone arm of this known record player deviates slightly from the correct tangential position with respect to the turntable axis. In order to eliminate this tracking-angle error due to the the position of the tone arm, the tone arm must be displaced laterally by moving the carriage axially along the spindle, until the correct tangential position of the arm is restored. The rotating spindle, in conjunction with a number of wheels on the carriage, forms part of a displacement servomechanism, the mechanism being in principle driven by the spindle. This mechanism has a disadvantage that the wheels must be in an accurately defined position in order to obtain a correct movement of the carriage to the desired position. The high number of revolutions of the spindle may give rise to rapid wear of the wheels. Moreover, the presence of the wheels may complicate correct positioning of the tone arm relative to a record on the turntable. Furthermore, as a result of the construction of the carriage and the servomechanism vibrations may occur, which may, for example, be caused by the drive of the spindle and which may have an adverse effect on the correct operation of the tone arm.

SUMMARY OF THE INVENTION

It is an object of the invention to provide a record player in which, when a record is being scanned, the lateral displacement of the tone arm is effected substantially without friction. While an optimum tangential position of the tone arm is maintained.

According to the invention, a record player or phonograph carriage, which is movable axially along a horizontal spindle and which carries a tone arm, comprises two bearings for supporting the carriage on the spindle, which bearings are spaced from each other in the axial direction of the spindle and each have a bearing surface which is constructed to engage the spindle at only part of the upper half of the circumferential surface of the spindle. The carriage also comprises a support for the tone arm, to which the tone arm is secured, and which is made of a vibration-damping material.

In the absence of static friction it is thus possible to obtain a lateral displacement of the tone arm of a record player with minimal lateral friction, the correct tangential position of the tone arm being constantly maintained. Owing to the spacing between the bearings and the fact that the bearings engage the spindle at only part of the circumference thereof on one side of the spindle, the carriage is capable of making small pivotal movements about axes transverse to the spindle in the case of accelerations in the movement of the tone arm such as those which occur when the lead-out groove of the record is reached, or if there is any eccentricity of the groove in the record. These pivotal movements of the carriage provide an effective compensation for the forces occurring during such accelerations. The vibrations caused by the spindle are suppressed effectively by the tone arm support which is made of a vibration-damping material, so that these vibrations have no adverse effect on the stylus carried by the tone arm.

In a preferred embodiment of the invention each bearing is constructed as a non-circular cylindrical sleeve bearing with a bearing surface which engages the spindle at a limited number of points. In this way any out-of-roundness of the spindle will have no adverse effect, so that less stringent requirements may be imposed on the machining accuracy of the spindle.

In this respect the bearing surface of each bearing may comprise a plurality of flat portions for engaging the spindle. A bearing having a bearing surface with flat portions can be manufactured simply so that the price of this bearing can remain comparatively low, while maintaining the advantages outlined above.

The bearing surface of each bearing may further comprise a semi-circular cylindrical portion which has clearance relative to the lower side of the spindle. The clearance may be distributed uniformly over the lower part of the bearing surface, so that the pivotal movement of the carriage during accelerations is limited satisfactorily.

In another embodiment of the invention in which the record player comprises a dust cover which can be pivoted between open and closed positions, each bearing is open at its underside so that the carriage can be lifted off the spindle, and the dust cover carries on its inner side a coupling member which, when the dust cover is pivoted to the open position, engages the carriage and lifts it off the spindle to raise the tone arm away from the turntable. Thus, when the dust cover is swung upwards to the open position the tone arm is moved with it away from the turntable to provide sufficient room between the tone arm and the turntable for putting on the record. This also means that the length of the tone arm can be small, so that its mass can be minimized.

Between the bearings the carriage may be formed in its upper side with a U-shaped recess in which is suspended a U-shaped support for the tone arm, the support being made of a vibration-damping material and the bottom portion of the support carrying a mounting to which the tone arm is secured. This form of support for the tone arm provides an effective damping of possible vibrations and also ensures that the force required for the lateral displacement of the tone arm, produced by the contact of the stylus with the wall of the groove, is transferred effectively from the tone arm to the carriage.

Alternatively, the carriage may comprise a body which is made of a vibration-damping material and which constitutes the support for the tone arm, and the bearings may be made of a low-friction material and be formed as separate parts inserted in the body. This results in a carriage of simple construction which has satisfactory vibration-damping properties and whose separate parts are slidable along the spindle.

In another preferred embodiment of the invention the tone arm comprises two parts between which a damping element is interposed. The element comprises a damping material for damping comparatively low frequencies, and the support comprises a damping material which is suitable for damping vibrations of comparatively high frequencies. This provides an effective damping of vibrations caused by motor driving the spindle and by out-of-roundness of the spindle. In a further embodiment wow and flutter which occurs during playing as a result of the action of the damping material is counteracted effectively, in that during playing the position of the stylus carried by the tone arm is such that the vector of the force exerted on the stylus by the record intersects the rotational axis of the spindle. The spindle and the motor may be carried by a U-shaped mounting which at its underside has a plurality of fixing elements by means of which the mounting is secured to the deck of the record player.

Embodiments of the invention will be described in more detail, by way of example, with reference to the accompanying drawings.

BRIEF DESCRIPTION OF THE DRAWING

FIG. 1 is a perspective view of a first embodiment of a record player in accordance with the invention;

FIG. 2 is a perspective view of part of the record player of FIG. 1 drawn to an enlarged scale;

FIG. 3 is a view looking in the direction of the arrow III in FIG. 2;

FIG. 4 is a view similar to signal 2 showing the corresponding part of a second embodiment of a record player in accordance with the invention;

FIG. 5 is a perspective view of part of a third embodiment of a record player in accordance with the invention;

DESCRIPTION OF THE PREFERRED EMBODIMENTS

Figure 6:
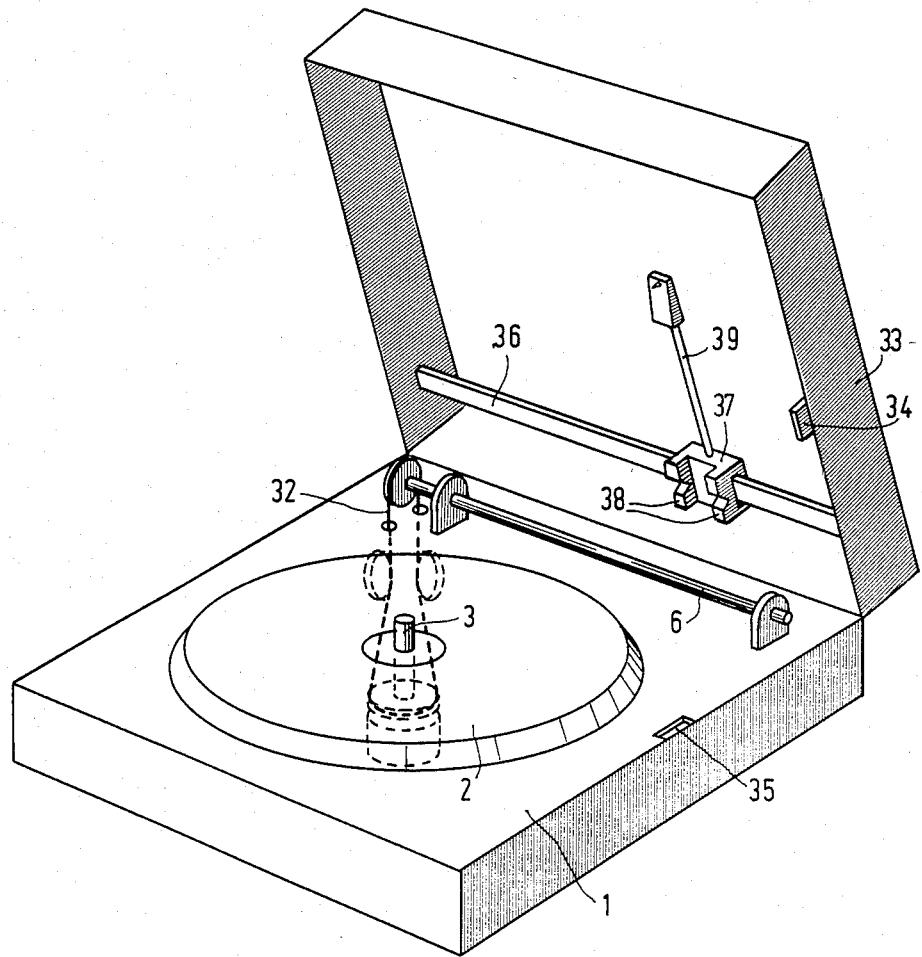
FIG. 6 is a perspective view of a fourth embodiment of a record player in accordance with the invention.

The record player shown in FIG. 1 comprises a deck 1 on which a turntable 2 is mounted for rotation about a vertical spindle 3. The deck 1 further carries two bearing supports 4 and 5, in which a horizontal circular cylindrical spindle 6 is rotatably mounted. On one end the spindle 6, which is machined to a desired roundness within certain limits of accuracy, carries a drive motor 7 which, during operation of the record player, rotates the spindle in the direction indicated by the arrow A. Preferably, the rotation is started by pressing a button 8 situated at the front of the deck, the drive mechanism (not shown) of the turntable 2 and the drive motor 7 being started simultaneously. In addition to the button 8 a button 9 is provided for selecting the desired speed of rotation of the turntable.

During operation of the record player a record 10 in the turntable 2 is scanned by a stylus 11 which is secured to a pick-up head 12 carried by a straight tone arm 13. To isolate low frequencies caused by vibrations, a resilient suspension may be arranged between the arm 13 and the pickup head 12.

At its rear end the tone arm 13 is attached to a carriage 14 which, as is shown in FIG. 2, is journalled on the spindle by means of two bearings 15 and 16 which are spaced from each other in the axial direction of the spindle 6. As shown in FIGS. 2 and 5, the lower part of the bearing surface of each of the bearings 15 and 16 has a clearance relative to the spindle 6 The lower part of the bearing surface of each bearing comprises a semicircular cylindrical portion 17 and the upper part comprises a plurality of flat portions 18 and 19. In this embodiment two flat portions bear on oblique portions of the upper half of the circumferential surface of the spindle, so that each bearing functions as a sleeve bearing which bears on the spindle only at a limited number of points. The bearings 15 and 16 are made of a suitable low-friction material such as a plastic and are formed as separate parts inserted in the main body 20 of the carriage. The body 20 is made of a vibration-damping material. This main body constitutes a support for the tone arm and may be made entirely of a vibration-damping material. Preferably, a material is employed which is capable of effectively damping vibrations caused by, for example, the motor 7, and specifically the high-frequency components thereof, so that such vibrations cannot be transmitted to the tone arm 13 and thus to the stylus 11.

Also mounted on the deck 1 is a rest 21 which serves for supporting and, as desired, securing the tone arm 13 in a rest position adjacent the turntable 2. A mechanism (not shown) may be arranged beneath the deck 1 for lifting the tone arm 13 off the rest when the start button 8 is pressed, moving the tone arm 13 to the lead-in groove of the record in accordance with the record diameter, lifting the tone arm 13 when the lead-out groove of the record is reached and returning the tone arm to the rest 21. For this purpose a pin 22 is provided which is located beneath the carriage 14 and which is movable in a slot 23 in the deck 1 and can be coupled to the mechanism beneath the deck 1 during these control movements.

During operation, as already stated, the spindle 6 is set into rotation simultaneously with the turntable when the start button 8 is pressed. As the stylus 11 follows the groove in the record 10 the rotation of the spindle enables the tone arm 13 to move laterally along the spindle with a very low lateral friction. This lateral displacement of the tone arm is caused by the movement of the stylus 11 in the direction indicated by the arrow B during tracking of the groove, the tone arm 13 constantly maintaining its correct tangential position with respect to the axis of the spindle 3. Therefore, it is important that the spindle 6 also is in a correct tangential position with respect to the axis of the spindle 3 and that the tone arm 13 extends perpendicularly to the axis of the spindle 6. The clearance of the bearings 15 and 16 relative to the spindle 6 in combination with the spacing between these bearings enables the carriage to make slight pivotal movements about axes transverse to the spindle 6 during accelerations in the movement of the tone arm. In general such accelerations occur when the lead-out groove of the record is reached, the tone arm 13 then being situated in the position indicated by the broken lines in FIG. 1. In this way the carriage is capable of effectively compensating for the forces which occur during these accelerations, thereby preventing the stylus 11 from jumping out of the groove. Such acceleration forces may also occur in the case of a record whose center hole is not centered exactly relative to the groove in the record. The transverse force exerted on the wall of the groove 6 the stylus as it moves in the direction of the arrow B during scanning of the groove is found to be negligible owing to the extremely low friction in the lateral direction. This transverse force may be reduced even further by arranging the deck of the record player in a slightly oblique position relative to the horizontal plane. It has been found that with a straight spindle 6 having a smooth perfect roundness and a diameter of 6 mm, wow and flutter remain below the limits imposed by Hi-Fi standards when the speed is 10-12 revolutions per second.

As is shown in FIG. 3 the record player has provisions which compensate for a slight out-of-roundness of the spindle. It is for this purpose that the flat surface portions 18 and 19 of the bearings 15 and 16 are provided, so that the spindle bears on these projecting portions of the bearing surfaces. Instead of the two flat surface portions shown, three or four such surface portions may be provided. For an accurate reproduction of the bearing clearance relative to the spindle 6 and for an adequate limitation of the pivotal movement of the carriage 14 during accelerations, it is found to be advantageous if the lower part of each bearing surface is semicircular cylindrical and is situated some distance from the underside of the spindle. This clearance also has the advantage that the normal force of the carriage relative to the spindle is not disturbed and the bearings cannot jam on the spindle 6.

While the spindle 6 is rotating, the tone arm 13 can be operated manually in a simple and smooth manner by means of a finger-grip 24 on the tone arm. This facilitates the cueing of the stylus 11 in a selected groove in the record.

In the embodiment of the invention shown in FIG. 4 the record player comprises a carriage 25 which can slide along the spindle 6 and which is made of a suitable low-friction material, the bearings of the carriage being arranged in downwardly projecting axially spaced limbs 26 and 27 of the carriage. Between the limbs 26 and 27 the upper side of this carriage has a U-shaped recess in which a U-shaped support 28 for the tone arm is placed. The support 28 is made of a vibration-damping material, and is shaped so that the support contacts the carriage 25 only at the tops of the U. On the bottom portion of the support 28 is a mounting 29 to which the tone arm 13 is attached. This construction provides a suspension for the tone arm 13 which is capable of effectively damping vibrations and which is also capable of effectively transmitting lateral displacement of the tone arm 13 in the direction of the arrow B to the carriage 25 to move this carriage along the spindle 6.

In the embodiment shown in FIG. 5 the spindle 6 and the motor 7 of the record player are carried by a U-shaped mounting 30 which at the underside has a plurality of fixing elements 31 by means of which the mounting 30 can be secured to the deck 1 of the record player. In this way any record player with a deck which has sufficient room to accommodate the mounting 30 may be provided with an accurately tangentially positioned tone arm 13.

In the embodiment shown in FIG. 6 the spindle 6 is driven by the drive mechanism of the turntable 2 through a cord or belt transmission 32. This method of driving the spindle 6 may also be used in the other embodiments described above. The record player shown in signal 6 comprises a hinged rigid dust cover 33 which can be pivoted between open and closed positions. When the cover 33 enters the closed position, a projection 34 on the cover closes a switch 35 to automatically start the drive of the turntable 2 and of the spindle 6. In the dust cover 33 a bar or like elongate member 36 is arranged which extends parallel to the spindle 6 through an opening in a carriage 37 which carries a tone arm 31. The arrangement, shape and size of the opening in the carriage 37 and the location of the member 36 in relation to the spindle 6 are such that when the dust cover is closed the carriage 37 is supported by the spindle 6 and the member 36 is not in contact with the carriage. In this way the member 36 forms a coupling member which is coupled to the carriage 37 only when the dust cover is open.

In order that the carriage 37 can be swung upwards away from the spindle 6 when the cover is opened, the carriage is provided with two bearings 38 are spaced from each other in the axial direction of the spindle 6, as in the preceding embodiments, but which are open at the underside, each bearing having a bearing surface which consists of two flat portions arranged in the form of an inverted V. For the remainder the carriage 37 may be constructed as shown in FIGS. 2, 3 and 4. The carriage 37 carries a comparatively short tone arm 39, which arm can be short because a record can be placed on or removed from the turnable freely when the dust cover 33 is opened. The advantage of the construction shown in FIG. 6 is that the mass of the tone arm 39 can be minimized, so that the mass to be moved along the spindle 6 is also low and the lateral friction can be smaller than in the preceding embodiments. Moreover, this has the advantage that the record player may have very small external dimensions.

It is to be noted that instead of the bearings shown the carriage may have cylindrical bearings whose outer diameter is slightly greater than the spindle diameter. These bearings may be made of a comparatively soft plastics in which a lubricant is embedded to improve the anti-friction properties.

Figure 7:
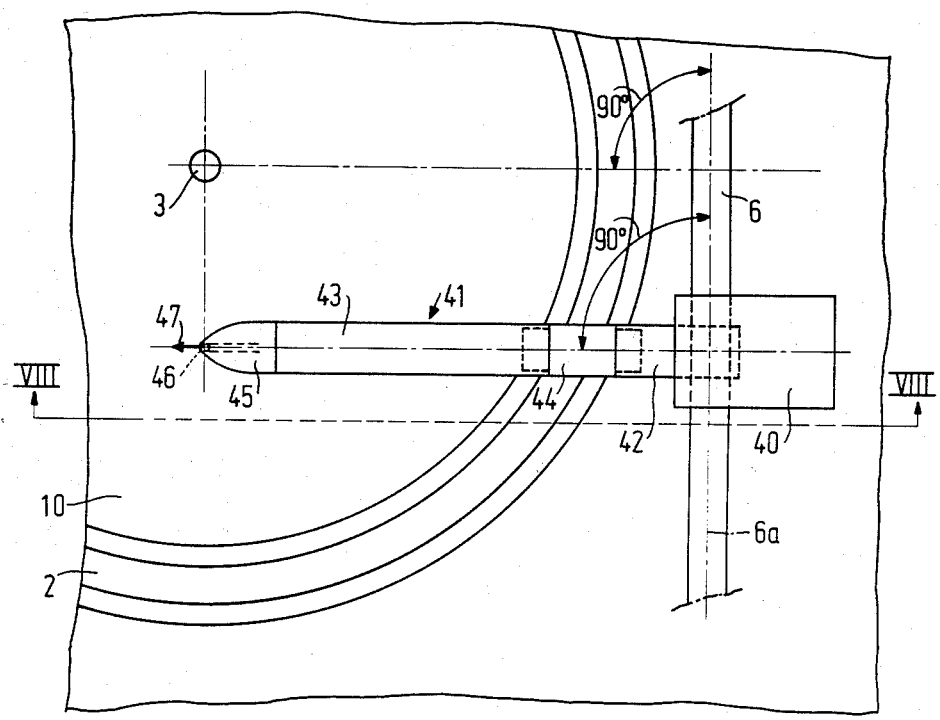
FIG. 7 is a perspective view of part of a fifth embodiment of a record player in accordance with the invention.
Figure 8:
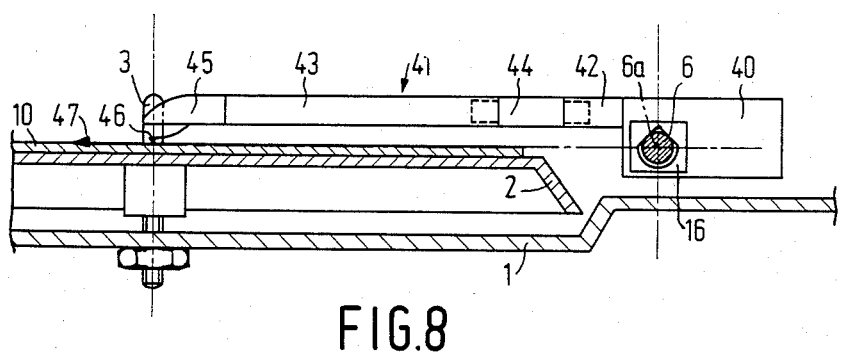
FIG. 8 is a sectional view taken on the lines VIII—VIII in FIG. 7.

An embodiment shown in FIGS. 7 and 8 employs a carriage 40 which largely resembles the carriage 14. The carriage 40 is provided with bearings 15 and 16 (FIGS. 2, 3) and with a support of a damping material intended for damping vibrations of comparatively high frequency. These vibrations are mainly caused by the drive motor 7 and are transmitted through the spindle 6. The carriage 40 carries a tone arm 41 comprising a first part 42 which is connected to the carriage 40. The tone arm 41 further comprises a second part 43, which is disposed in line with the first part 42 and which is connected to this first part 42 through a damping element 44. The damping element 44 may be made of a suitable elastomeric material, but alternatively may be made of, for example, a plate-spring material. It is important only that the damping element 44 in the tone arm 41 damps comparatively low frequencies ("rumble") caused by out-of-roundness of the spindle 6. In this way a separate damping is applied for the higher and the lower frequencies by means of the damping material in the carriage 40 and the damping element 44 respectively.

The end portion of the second part 43 carries a pick-up head 45 with a stylus 46. As is shown in FIG. 7 the axis of the tone arm 41, as in the preceding embodiments, extends perpendicularly to the rotational axis 6a of the spindle 6, so that the tone arm 41 constantly occupies a tangential position with respect to the turntable 2 and the record 10 on this turntable. Further, it is important that, as indicated by the arrow 47 in FIG. 8, the vector of the force exerted on the stylus 46 by the record 10 during playing always intersects the rotational axis 6a of the spindle 6 in order to ensure that the action of the damping element 44 in damping so-called "rumble" does not give rise to undesired longitudinal tangentially directed displacements of the stylus 46 in the groove of the record 10. If as a result of a higher or lower position of the spindle 6 the vector 47 does not intersect the rotational axis 6a, the "rumble" would be damped but the tone arm 41 would be pivoted about the spindle 6, causing undesired tangential displacements of the stylus, thereby giving rise to "wow and flutter". Thus, if the vector 47 intersects the rotational axis 6a, additional "wow-and-flutter" cannot occur. This advantage is achieved by the arrangement of the carriage 40, the tone arm 41, the pick-up head 45 and the stylus 46 relative to each other, as shown in FIG. 8.

What is claimed is:

1. A record player comprising a turntable arranged for rotation about a vertical axis, a horizontal rotatable spindle which extends tangentially with respect to said vertical axis and has a circumferential surface, a motor for rotating the spindle during operation of the record player, and a carriage which is movable axially along the spindle and which carries a tone arm having a stylus end extending in a horizontal direction from the carriage transversely to said spindle, wherein said carriage comprises two bearings for supporting the carriage on the spindle during normal operation, said bearings being spaced from each other in the axial direction of the spindle and each having a bearing surface which is arranged to engage the spindle at part of the upper half of the circumferential surface only, thereby allowing the carriage to twist about the spindle upon rapid acceleration of said stylus end, and the carriage comprises a support made of a vibration-damping material to which the tone arm is secured.

2. A record player as claimed in claim 1, wherein the bearing surface of each bearing comprises a plurality of flat portions for engaging the spindle.

3. A record player as claimed in claim 1 or 2, wherein each bearing is constructed as a non-circular cylindrical sleeve bearing having a bearing surface arrange to engage the spindle at a limited number of points.

4. A record player as claimed in claim 3, wherein the bearing surface of each bearing has a semicircular cylindrical lower portion which has clearance relative to the lower half of the spindle.

5. A record player as claimed in claim 4, wherein the carriage comprises a body made of a vibration-damping material, said body constituting said support; and the bearings are made of a low-friction material and are formed as separate parts inserted in said body.

6. A record player as claimed in claim 1 or 2, wherein the carriage comprises a body made of a vibration-damping material, said body constituting said support; and the bearings are made of a low-friction material and are formed as separate parts inserted in said body.

7. A record player as claimed in claim 6, wherein the tone arm comprises two parts and a damping element interposed between said two parts, said element comprising a damping material for damping comparatively low frequencies; and said support comprises a damping material suitable for damping vibrations of comparatively high frequencies.

8. A record player as claimed in claim 1 or 2, wherein the tone arm comprises two parts and a damping element interposed between said two parts, said element comprising a damping material for damping comparatively low frequencies; and said support comprises a damping material suitable for damping vibrations of comparatively high frequencies.

9. A record player comprising a turntable arranged for rotation about a vertical axis, a horizontal rotatable spindle which extends tangentially with respect to said vertical axis and has a circumferential surface, a motor for rotating the spindle during operation of the record player, a carriage which is movable axially along the spindle and which carries a tone arm having a stylus end extending in a horizontal direction from the carriage transversely to said spindle, and a dust cover which can be pivoted between open and closed positions, wherein said carriage comprises two bearings for supporting the carriage on the spindle during normal operation, said bearings being spaced from each other in the axial direction of the spindle and each having a bearing surface which is arranged to engage the spindle at part of the upper half of the circumferential surface only, each bearing being open at its underside, thereby allowing the carriage to twist about the spindle upon rapid acceleration of said stylus end, and the player comprises means for lifting the carriage off the spindle upon opening the cover.

10. A record player as claimed in claim 9, wherein said means for lifting comprises a coupling bar connected to said cover and extending parallel to said spindle through an opening in the carriage, said opening and bar being arranged such that said carriage is free of contact with said bar when the dust cover is closed.

11. A record player as claimed in claim 9 or 10, wherein the tone arm comprises two parts and a damping element interposed between said two parts, said element comprising a damping material for damping comparatively low frequencies; and said carriage comprises a damping material suitable for damping vibrations of comparatively high frequencies.

12. A record player as claimed in claim 1, 2, 9 or 10, wherein said spindle and turntable are arranged such that, during normal playing, the position of a stylus carried at said stylus end, in contact with a record being played, is such that the vector of the force exerted on the stylus by the record intersects the rotational axis of the spindle.

13. A record player as claimed in claim 9 or 10, wherein the carriage comprises a body made of a vibration-damping material; and the bearings are made of a low-friction material and are formed as separate parts inserted in said body.

14. A record player as claimed in claim 13, wherein the tone arm comprises two parts and a damping element interposed between said two parts, said element comprising a damping material for damping comparatively low frequencies; and said carriage damping material is suitable for damping vibrations of comparatively high frequencies.

15. A record player as claimed in claim 14, wherein said spindle and turntable are arranged such that, during normal playing, the position of a stylus carried by said stylus end, in contact with a record being played, is such that the vector of the force exerted on the stylus by the record intersects the rotational axis of the spindle.

16. A record player as claimed in claim 1, 2, 9 or 10, comprising a U-shaped mounting on which said spindle and motor for rotating the spindle are carried, and a plurality of fixing elements arranged at the underside of the U-shaped mounting for securing the mounting to the deck of the record player.

* * * * *